United States Patent
Thomas et al.

(10) Patent No.: US 7,820,001 B2
(45) Date of Patent: Oct. 26, 2010

(54) LATENT ELASTIC LAMINATES AND METHODS OF MAKING LATENT ELASTIC LAMINATES

(75) Inventors: Oomman P. Thomas, Alpharetta, GA (US); James R. Fitts, Jr., Gainesville, GA (US); Howard M. Welch, Woodstock, GA (US); Gregory K. Hall, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1316 days.

(21) Appl. No.: 11/304,434

(22) Filed: Dec. 15, 2005

(65) Prior Publication Data

US 2007/0137767 A1 Jun. 21, 2007

(51) Int. Cl.
*B32B 37/00* (2006.01)
(52) U.S. Cl. .................. 156/161; 156/163; 156/164; 156/229
(58) Field of Classification Search .............. 156/160, 156/161, 163, 164, 229
See application file for complete search history.

(56) References Cited

U.S. PATENT DOCUMENTS

| | | | |
|---|---|---|---|
| 3,214,323 A | 10/1965 | Russell et al. | |
| 3,272,898 A | 9/1966 | Knee | |
| 3,331,728 A | 7/1967 | Lane | |
| 3,338,992 A | 8/1967 | Kinney | |
| 3,341,394 A | 9/1967 | Kinney | |
| 3,502,763 A | 3/1970 | Hartmann | |
| 3,542,615 A | 11/1970 | Dobo et al. | |
| 3,546,056 A | 12/1970 | Thomas | |
| 3,597,299 A | 8/1971 | Thomas | |
| 3,622,434 A | 11/1971 | Newman | |
| 3,692,618 A | 9/1972 | Dorschner et al. | |
| 3,694,815 A * | 10/1972 | Burger ......................... | 2/400 |
| 3,802,817 A | 4/1974 | Matsuki et al. | |

(Continued)

FOREIGN PATENT DOCUMENTS

DE 2 223 780 11/1973

(Continued)

OTHER PUBLICATIONS

A.A. Burgeni and C. Kapur, Capillary Sorption Equilibria in Fiber Masses, *Textile Research Journal*, vol. 37, May 1967, pp. 356-366.

*Primary Examiner*—Jeff H Aftergut
(74) *Attorney, Agent, or Firm*—Dority & Manning, P.A.

(57) ABSTRACT

A latent elastic laminate material, and methods of making latent elastic laminate materials. The laminate includes a latent polymer, which itself may or may not possess latent elasticity, that is applied to at least one elastic member while the elastic member is in a stretched configuration. The elastic member, at least partially covered with the latent polymer, is attached to at least one substrate. The amount of latent polymer applied to the elastic member may provide enough force to overcome a retractive force of the elastic member when the latent polymer is at a temperature below a softening point of the latent polymer, yet the amount of latent polymer may be small enough to allow the laminate to retract into an elastic, gathered structure when the laminate is heated to a softening point of the latent polymer. The laminate may be incorporated into a variety of articles including personal care garments and cleaning cloths.

10 Claims, 6 Drawing Sheets

U.S. PATENT DOCUMENTS

| | | | |
|---|---|---|---|
| 3,849,241 A | 11/1974 | Butin et al. | |
| 3,925,127 A | 12/1975 | Yoshioka | |
| 4,133,924 A | 1/1979 | Seino et al. | |
| 4,340,563 A | 7/1982 | Appel et al. | |
| 4,552,795 A | 11/1985 | Hansen et al. | |
| 4,560,372 A | 12/1985 | Pieniak | |
| 4,640,859 A * | 2/1987 | Hansen et al. | 428/105 |
| 4,665,306 A | 5/1987 | Roland et al. | |
| 4,762,521 A | 8/1988 | Roessler et al. | |
| 4,842,596 A | 6/1989 | Kielpikowski et al. | |
| 4,908,247 A * | 3/1990 | Baird et al. | 428/34.9 |
| 5,032,121 A | 7/1991 | Mokry | |
| 5,057,368 A | 10/1991 | Largman et al. | |
| 5,069,970 A | 12/1991 | Largman et al. | |
| 5,108,820 A | 4/1992 | Kaneko et al. | |
| 5,108,827 A | 4/1992 | Gessner | |
| 5,171,239 A | 12/1992 | Igaue et al. | |
| 5,207,664 A | 5/1993 | Blanco | |
| 5,257,982 A | 11/1993 | Cohen et al. | |
| 5,272,236 A | 12/1993 | Lai et al. | |
| 5,277,976 A | 1/1994 | Hogle et al. | |
| 5,294,482 A | 3/1994 | Gessner | |
| 5,322,728 A | 6/1994 | Davey et al. | |
| 5,336,552 A | 8/1994 | Strack et al. | |
| 5,376,198 A | 12/1994 | Fahrenkrug et al. | |
| 5,385,775 A | 1/1995 | Wright | |
| 5,422,172 A | 6/1995 | Wu | |
| 5,466,410 A | 11/1995 | Hills | |
| 5,482,772 A | 1/1996 | Strack et al. | |
| 5,491,016 A | 2/1996 | Kaiser et al. | |
| 5,514,470 A | 5/1996 | Haffner et al. | |
| 5,536,555 A | 7/1996 | Zelazoski et al. | |
| 5,567,501 A | 10/1996 | Srinivasan et al. | |
| 5,571,619 A | 11/1996 | McAlpin et al. | |
| 5,643,240 A | 7/1997 | Jackson et al. | |
| 5,674,211 A | 10/1997 | Ekdahl | |
| 5,679,042 A | 10/1997 | Varona | |
| 5,700,255 A | 12/1997 | Curro et al. | |
| 5,707,468 A | 1/1998 | Arnold et al. | |
| 5,789,328 A | 8/1998 | Kurihara | |
| 5,804,021 A | 9/1998 | Abuto et al. | |
| 5,814,178 A | 9/1998 | Jacobs | |
| 5,830,555 A | 11/1998 | Srinivasan et al. | |
| 5,851,935 A | 12/1998 | Srinivasan et al. | |
| 5,873,868 A | 2/1999 | Nakahata | |
| 5,883,028 A | 3/1999 | Morman et al. | |
| 5,906,879 A | 5/1999 | Huntoon et al. | |
| 5,914,184 A | 6/1999 | Morman | |
| 5,964,973 A * | 10/1999 | Heath et al. | 156/161 |
| 5,990,377 A | 11/1999 | Chen et al. | |
| 6,001,303 A | 12/1999 | Haynes et al. | |
| 6,018,093 A | 1/2000 | Roe et al. | |
| 6,168,585 B1 | 1/2001 | Cesco-Cancian | |
| 6,217,889 B1 | 4/2001 | Lorenzi et al. | |
| 6,491,777 B1 | 12/2002 | Bevins et al. | |
| 6,491,928 B1 | 12/2002 | Smith, III | |
| 6,503,431 B1 | 1/2003 | Kasai et al. | |
| 6,613,033 B1 | 9/2003 | Popp et al. | |
| 6,663,611 B2 | 12/2003 | Blaney et al. | |
| 6,969,441 B2 * | 11/2005 | Welch et al. | 156/161 |
| 7,045,029 B2 | 5/2006 | DeLucia et al. | |
| 7,118,639 B2 | 10/2006 | DeLucia et al. | |
| 2004/0005834 A1 | 1/2004 | Zhou et al. | |
| 2004/0107481 A1 | 6/2004 | Mortell et al. | |
| 2004/0158217 A1 | 8/2004 | Wu et al. | |
| 2005/0131382 A1 | 6/2005 | Brud et al. | |
| 2005/0148980 A1 | 7/2005 | Fitton | |
| 2006/0137810 A1* | 6/2006 | Beck et al. | 156/229 |
| 2008/0306194 A1* | 12/2008 | Sun et al. | 524/274 |

FOREIGN PATENT DOCUMENTS

| | | |
|---|---|---|
| DE | 195 23 497 A1 | 1/1997 |
| EP | 0 211 197 | 2/1987 |
| EP | 0 330 716 A2 | 9/1989 |
| EP | 0330716 * | 9/1989 |
| EP | 0 687 757 A2 | 12/1995 |
| EP | 0 586 924 B1 | 10/1997 |
| EP | 0 617 940 | 11/1999 |
| GB | 783726 | 9/1957 |
| GB | 1 293 456 | 10/1972 |
| GB | 2 160 817 A | 1/1986 |
| GB | 2 284 786 A | 6/1995 |
| JP | 06031869 | 2/1994 |
| JP | 08176947 | 12/1994 |
| JP | 8-176947 | 7/1996 |
| WO | WO 00/38918 | 7/2000 |
| WO | WO 01/87589 | 11/2001 |
| WO | WO 2005/030090 | 4/2005 |
| WO | WO 2006/118838 A2 | 11/2006 |

* cited by examiner

LATENT ELASTIC LAMINATES AND METHODS OF MAKING LATENT ELASTIC LAMINATES

BACKGROUND OF THE INVENTION

This invention is directed to laminates having latent elastic properties provided by a latent polymer applied to at least one elastic member, and methods of making the laminates, as well as products incorporating the laminates.

Many personal care products contain elastic laminate components in such areas as leg gaskets, waistbands, and side panels. These elastic laminates provide a variety of functionalities including one-size-fits-all capability, conformance of the product on the user, sustained fit over time, leakage protection, and improved absorbency, for example.

Most conventional elastic laminate materials are produced and subsequently incorporated into an end product, rather than being produced in-situ. The elastic character of the laminate makes it challenging to manipulate the laminate when trimming or slitting the material, as well as when incorporating the material into an end product. In addition, for many elastic laminate materials, it is difficult to hold down the laminate for trimming and slitting by applying conventional vacuum techniques because of the low-density, highly porous nature of the nonwoven facings between which the elastomeric member is positioned. Although high levels of meltblown adhesive covering the entire laminate may result in the laminate being more conducive to being vacuum controlled, excess meltblown adhesive may create undue stiffness and unnecessary costs.

Thermoplastic elastomers and their blends and compounds have varying levels of inherent set characteristics, resulting in "latent" elastic behavior. Elasticity retrieval is most commonly performed by heat shrinking, although several other methods may be employed, including chemical and microwave treatment. Although latent elastic polymers simplify material handling during conversion processes, many latent elastic polymer applications lack sufficient retraction forces.

There is thus a need or desire for elastic laminate materials that can be easily controlled during converting processes without sacrificing elastomeric properties.

SUMMARY OF THE INVENTION

In response to the discussed difficulties and problems encountered in the prior art, new latent elastic laminate materials, as well as methods of forming such latent elastic laminate materials, have been discovered.

In certain embodiments, the latent elastic laminate material includes a latent polymer at least partially covering one or more elastic members. The latent polymer may bond the elastic members to one or more substrates. Alternatively, a separate adhesive may be used to bond the layers of the laminate. In any event, the amount of latent polymer applied to the elastic members to form the laminate may provide enough force to overcome a retractive force of the elastic members when the latent polymer has been applied to the elastic members in a stretched state and the latent polymer is at a temperature below a softening point of the latent polymer, yet the amount of latent polymer may also be small enough to allow the laminate to retract into an elastic, gathered structure when the laminate is heated to a softening point of the latent polymer.

The elastic members may be stretched while bonding the elastic members to the substrate. Suitably, the latent polymer may be applied to the elastic members at a basis weight between about 2 and about 60 grams per square meter (gsm), or between about 5 and 10 gsm. The bonding may be carried out using smooth roll calendering.

The elastic member or members may be in the form of filaments, film, foam, scrim, or any combination thereof. A vertical or continuous filament lamination process may be used to stretch the elastic member or members.

The latent polymer, with or without a separate adhesive, may be applied in the form of filaments, film, starved slot-coated film, a swirled or oscillated application, strand wrapping, melt blow spray, or any combination thereof. The latent polymer itself may or may not possess latent elasticity. For instance, the latent polymer may be an adhesive or a non-elastic polymer that initially maintains the elastic member or members in a stretched state, but upon activation allows the laminate to retract. In various embodiments, the latent polymer may include an adhesive, a polyolefin, an elastomeric polyolefin, metallocene polyethylene, and/or a thermoplastic elastic such as tackified styrenic block-copolymer, polyurethane, or any combination thereof. Suitably, the latent polymer may have a glass transition temperature of about 22 degrees Celsius or higher, or about 37 degrees Celsius or higher.

The substrate may be either a woven web or a nonwoven web. In certain embodiments, the substrate may be a non-elastic material.

During the manufacturing process, the latent elastic laminate material may be passed from a pair of nip rolls onto a winding roll running at about the same speed as the nip rolls. Once the laminate has been formed, the laminate may be heated to a softening point of the latent polymer and allowed to retract into a gathered structure that is elastic. Before heating the laminate, the laminate may be cut, slit, or put through any converting steps. Furthermore, the laminate may be produced in-situ during the production of a personal care garment.

In certain embodiments, the latent polymer may be applied directly to the stretched elastic member or members, thereby at least partially coating the elastic member or members. One or more substrates may then be attached to the coated elastic member or members.

The latent polymer may or may not be used to bond the elastic members to the substrate. In certain embodiments, for example, the latent polymer may be applied to the elastic members, and a hot melt adhesive may be used to attach the substrate to the elastic members. Furthermore, an adhesive may also be used to attach the latent polymer to the elastic members.

The latent elastic laminate material may be incorporated into any of a variety of applications, such as in a leg gasket, a waistband, a side panel, or any other component of a personal care garment. Alternatively, the latent elastic laminate material may be used to form a cleaning wipe. In certain embodiments, the laminate may be heated to impart abrasive properties, which may be desirable in cleaning wipes or various other products.

With the foregoing in mind, it is a feature and advantage of the invention to provide latent elastic laminate materials that can be easily controlled during converting processes without sacrificing elastomeric properties. It is another feature and advantage to provide a method of making such latent elastic laminate materials.

BRIEF DESCRIPTION OF THE DRAWINGS

These and other objects and features of this invention will be better understood from the following detailed description taken in conjunction with the drawings, wherein.

DEFINITIONS

Within the context of this specification, each term or phrase below will include the following meaning or meanings.

"Bonded" refers to the joining, adhering, connecting, attaching, or the like, of two elements. Two elements will be considered to be bonded together when they are bonded directly to one another or indirectly to one another, such as when each is directly bonded to intermediate elements.

"Boxer shorts" refers to a garment having hanging legs. "Hanging legs" refers to the portions of a garment which extend from the crotch region downward to the leg openings. "Downward" refers to a direction toward the ground when the garment is positioned on a standing wearer.

"Directly applied" refers to the attaching, joining, adhering, connecting, bonding, or the like, of two elements wherein the two elements are in direct contact with one another along at least a portion of the attached area. Bonding materials themselves, such as adhesives, if necessary, may not be considered "intermediate elements," but are merely devices used to facilitate the direct attachment of two elements.

"Elastic" means that property of a material or composite by virtue of which it tends to stretch when exposed to a stretching force, and to recover most or all of the way to its original size and shape after removal of the stretching force. An elastic material should be able to stretch in at least one direction by at least 50% of its initial (unstretched) length without rupturing, and should immediately recover more than 50% of its stretched length when the stretching force is removed. A hypothetical example that would satisfy this definition of an elastic material would be a one (1) inch sample of a material which is elongatable to at least 1.50 inches and which, upon being elongated to 1.50 inches and released, will recover to a length of less than 1.25 inches. Many elastic materials may be stretched by much more than 50 percent of their relaxed length, and many of these will recover to substantially their original relaxed length upon release of the stretching force.

"Garment" includes personal care garments, medical garments, and the like. The term "disposable garment" includes garments which are typically disposed of after 1-5 uses. The term "personal care garment" includes diapers, training pants, boxer shorts, swimwear, absorbent underpants, adult incontinence products, feminine hygiene products, and the like. The term "medical garment" includes medical (i.e., protective and/or surgical) gowns, caps, gloves, drapes, face masks, and the like.

"Latent" refers to a non-elastic state of a polymer in which the elasticity is hidden. The latent polymer is maintained in the latent state by high intermolecular forces, such as hydrogen bonding or ionic association between polymer molecules, and/or by the crystalline state of the polymer molecules. The polymer composite can be made latent at about room temperature (~23° C.) or below, or any other temperature when the intermolecular forces and/or crystals can form. Latent polymer composites can assume elastic characteristics when the intermolecular forces maintaining the latent polymer are overcome by applying thermal energy, such as melting the crystals holding the polymer composite in the latent state. The latent polymer composite has little or no recovery towards the original unstretched length until the crystals are melted by the addition of heat.

"Latent polymer," as used herein, refers to a polymer that may render latent properties to a laminate. The latent polymer itself may or may not possess latent properties.

"Leg gasket" includes elastic bands, strands, ribbons, filaments, filament bunches and the like, that are adjacent to a garment opening that receives a wearer's leg and exhibit a moderate level of elastic tension against a wearer's body during use, thereby restricting the flow of liquid and other material through the garment opening between the inside and outside of the garment.

"Meltblown fiber" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than about 0.6 denier, and are generally self bonding when deposited onto a collecting surface. Meltblown fibers used in the present invention are preferably substantially continuous in length.

"Nonwoven" and "nonwoven web" refer to materials and webs of material having a structure of individual fibers or filaments which are interlaid, but not in an identifiable manner as in a knitted fabric. The terms "fiber" and "filament" are used herein interchangeably. Nonwoven fabrics or webs have been formed from many processes such as, for example, meltblowing processes, spunblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.)

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

"Spunbond fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al.; U.S. Pat. No. 3,692,618 to Dorschner et al.; U.S. Pat. No. 3,802,817 to Matsuki et al.; U.S. Pat. Nos. 3,338,992 and 3,341,394 to Kinney; U.S. Pat. No. 3,502,763 to Hartman; and U.S. Pat. No. 3,542,615 to Dobo et al., each of which is incorporated herein by reference in its entirety in a manner consistent with the present invention. Spunbond fibers are generally not tacky when they are deposited onto a collecting surface. Spunbond fibers are generally continuous and have average diameters (from a sample of at least 10) larger than 7 microns (μm), more particularly, between about 10 and 25 microns (μm), or up to about 30 microns (μm) or more.

"Stretch" or "stretching" refers to the act of applying an extending force to a material that may or may not undergo retraction.

"Thermoplastic" describes a material that softens when exposed to heat and which substantially returns to a nonsoftened condition when cooled to room temperature.

"Waistband" includes elastic bands, strands, ribbons, filaments, filament bunches and the like, that are adjacent to a garment opening that receives a wearer's waist.

These terms may be defined with additional language in the remaining portions of the specification.

DESCRIPTION OF PREFERRED EMBODIMENTS

In accordance with the invention, latent elastic laminate materials that achieve latency through force balance are useful in a variety of products, including personal care garments. Elastic materials are particularly useful in stretchable areas of personal care garments and are generally used to fit the garment to the user. In certain embodiments of the invention, latent elastic laminate materials are used in the waist and/or leg regions of a personal care garment, such as a diaper, training pants, or boxer shorts. The laminates, when in the activated elastic state, provide a snug fit on the user to diminish leaking of bodily wastes held in the garment. Using the latent elastic laminate materials of the invention to manufacture personal care garments and subsequently activating the latent elastic laminate materials to become elastic simplifies manufacturing and results in garments having good elastic properties in the regions in which the laminates are applied.

Figure 1:
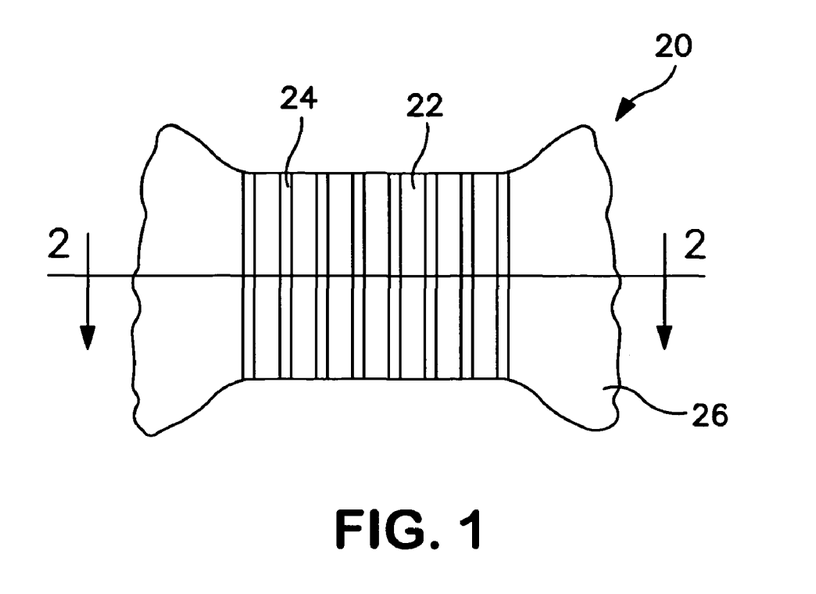
FIG. 1 is a top view of one embodiment of a laminate of the invention.

As shown in FIG. 1, a laminate 20 including a latent polymer 22 at least partially covering one or more elastic members 24 and at least one substrate 26a, 26b attached to the elastic members 24, as viewed from atop the laminate 20, has been activated to render the latent polymer 22 elastic. Since the latent elasticity of the laminate 20 can be activated after the laminate 20 has been formed, the laminate 20 can easily be controlled during converting processes without sacrificing the elastomeric properties of the elastic members 24 within the laminate 20.

Figure 2:
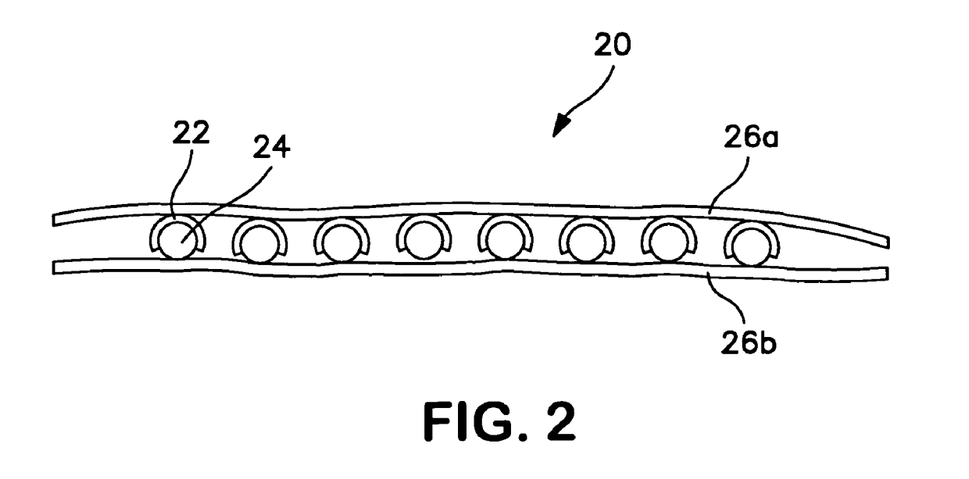
FIG. 2 is an enlarged cross-sectional view taken along line 2-2 of FIG. 1 of one embodiment of a laminate of the invention.
Figure 3:
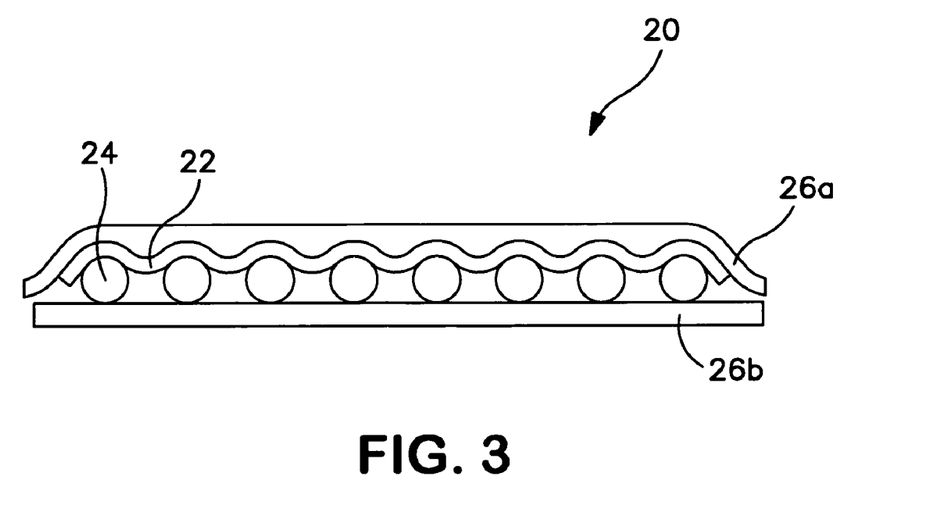
FIGS. 3 and 4 illustrate cross-sectional views, similar to FIG. 2, of various embodiments of a laminate of the invention.
Figure 4:
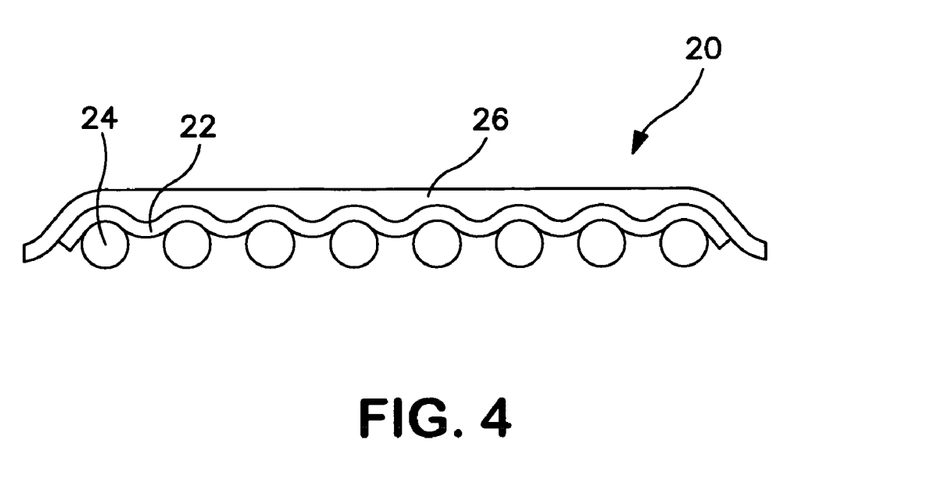

In certain embodiments, as shown in FIG. 2, the latent polymer 22 may coat the elastic members 24, either wholly or in part, thereby forming a discontinuous layer of the latent polymer 22 within the laminate 20. Alternatively, as shown in FIGS. 3 and 4, the latent polymer 22 may be applied as a continuous layer over the elastic members 24. Furthermore, the latent polymer 22 and elastic members 24 may be positioned between two or more substrates 26a, 26b, or facing layers, as shown in FIGS. 2 and 3, or just one substrate 26 may be attached to the latent-polymer-covered elastic members 24.

Figure 5:
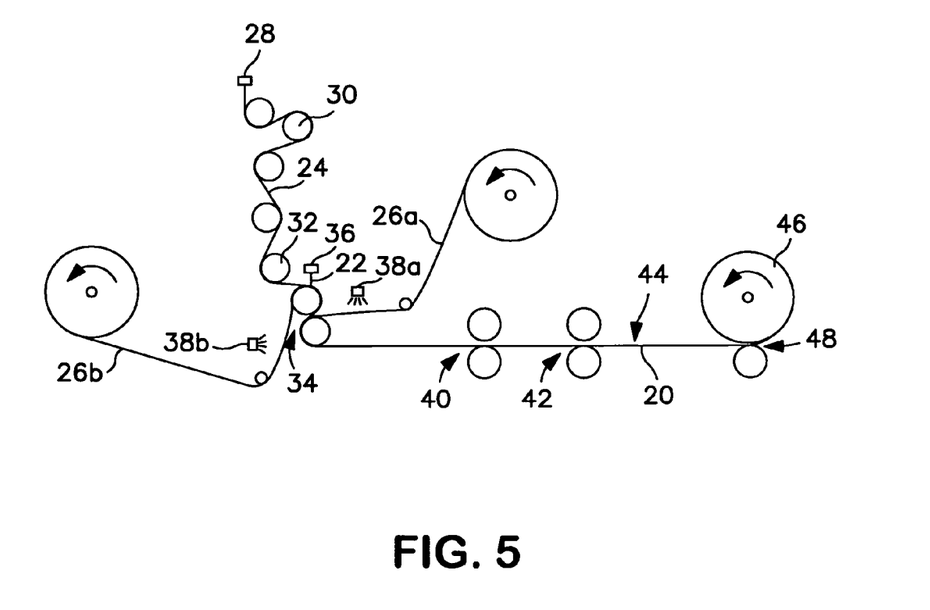
FIGS. 5 and 6 are schematic views illustrating various embodiments of processes by which the laminate of the invention can be prepared.

One example of a method for forming the latent elastic laminate 20 is illustrated in FIG. 5. As shown in FIG. 5, the elastic members 24 can be extruded through a filament die 28, for example, and passed through a series of chill rolls 30 in a vertical filament lamination process, thereby stretching the elastic members 24. Vertical filament lamination (VFL) processes are described in greater detail in PCT Publication WO01/87589, published 22 Nov. 2001, and entitled ELASTIC STRANDED LAMINATE WITH ADHESIVE BONDS AND METHOD OF MANUFACTURE by H. M. Welch et al., incorporated herein by reference in its entirety in a manner consistent with the invention. Another suitable lamination process is a continuous filament stretch-bonded laminate process, such as described in U.S. Pat. No. 5,385,774 issued to Wright, also incorporated herein by reference in its entirety in a manner consistent with the invention. More particularly, the elastic members 24 may be stretched several times their original length, for example between about 100% and about 700%, or between about 300% and about 500%, or between about 200% and about 450% their original length, by increasing the speed of a lamination nip 34 with respect to an idler roll 32 over which the elastic members 24 pass. It has been observed that the use of a Ramisch patterned roll with an anvil roll as the lamination nip creates laminate materials that are less latent than use of smooth roll calendars. Smooth roll calendered materials give higher shrinkage when heat-activated than materials laminated with patterned rolls. Therefore, it may be advantageous to use smooth roll calendering in the processes described herein.

The elastic members 24 are passed from the idler roll 32 to the lamination nip 34 where the latent polymer 22 is then directly applied to the elastic members 34 through a filament die 36, a film die, or other suitable extrusion die. The substrate 26a is simultaneously passed through the lamination nip 34 such that the latent polymer 22 is positioned between the elastic members 24 and the substrate 26a. In some embodiments the latent polymer 22 may possess sufficient adhesive properties to successfully bond the elastic members 24 to the substrate 26a. However, a separate adhesive 38a, such as a meltblown hot melt adhesive, may be applied to the substrate 26a prior to coming in contact with the latent-polymer-coated elastic members 24, provided the hot melt adhesive is not too hot (a temperature below the softening point of the latent polymer is generally useable) so the adhesive does not activate the latent polymer 22. Additionally, if a second substrate 26b or facing material is to be included in the laminate 20, the second substrate 26b may also be simultaneously passed through the lamination nip 34 with a meltblown adhesive 38b or other adhesive applied to the second substrate 26b prior to coming in contact with the latent-polymer-coated elastic members 24. In certain embodiments, the latent polymer 22 and the adhesive 38 may be extruded side-by-side. Furthermore, in certain embodiments, both the elastic members 24 and the latent polymer 22 may be stretched as a unit after the latent polymer 22 has been applied to the already-stretched elastic members 24. In any case, the latent polymer 22 is suitably stretched to a lesser extent than the elastic members 24.

After the latent-polymer-coated elastic members 24 and substrate(s) 26a, 26b pass through the lamination nip 34, the resulting laminate 20 may then pass through a slitter nip 40 or other cutting device, and/or additional nip rolls 42. The laminate 20 may further pass through a relaxation zone 44 prior to being wound on a winding roll 46 at a winder nip 48. Suitably, the winding roll 46 and the preceding nip rolls 42 may run at the same speed. Consequently, the production rate of this laminate 20 may be higher than elastic laminates including non-latent materials because the winding rolls 46 can run at the same speed as the nip rolls 42.

The formed laminate 20 can be heat activated by heating the laminate 20 to at least a softening point of the latent polymer 22. When the latent polymer 22 softens, the elastic members 24 are able to retract and gather the substrate 26, thereby resulting in a gathered structure that is elastic. Latent heat activation may be achieved at temperatures between about 70 and about 290 degrees Celsius, or between about 70 and about 200 degrees Celsius, depending largely upon the glass transition temperature of the latent polymer as well as the basis weight of the polymer and the laminate, and also depends upon the dwell time. For example, the latent heat activation may be achieved at a temperature between about 140 and about 160 degrees Celsius with a dwell time of about 5 to about 10 seconds, or at a temperature between about 70 and about 160 degrees Celsius with a dwell time of about 1 to about 10 seconds. Activating the laminate 20 after cutting, slitting, or performing any other converting processes, such as attachment processes, on the laminate 20 allows the laminate 20 to be easily controlled during the converting processes, in contrast with elastomeric materials that can be easily misaligned or misguided during handling.

Figure 6:
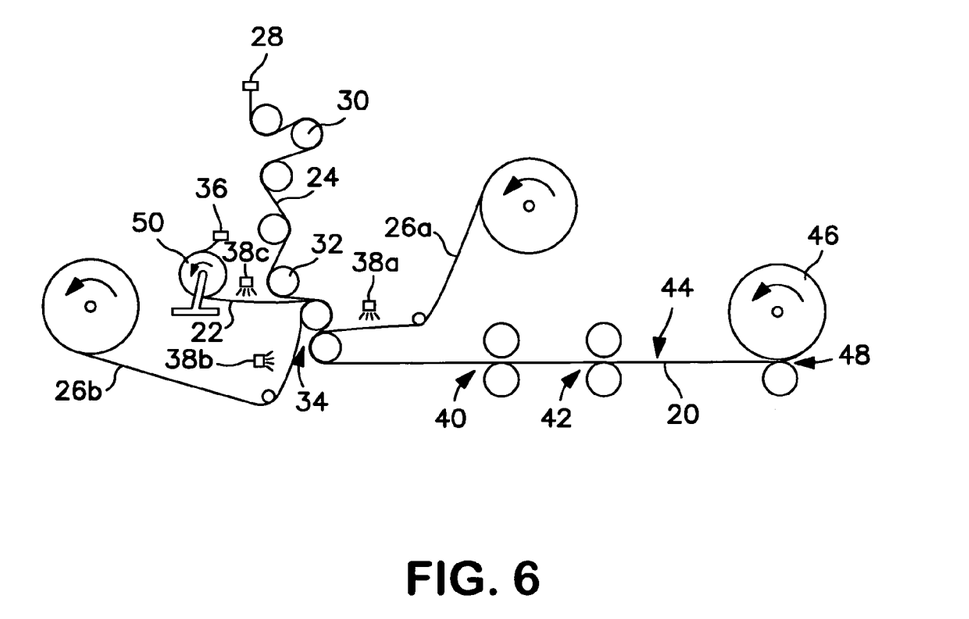

Another example of a method of forming the latent elastic laminate 20 is illustrated in FIG. 6. Similar to the method shown in FIG. 5, this method differs in that the latent polymer 22 is delivered to a filament or film die 36 and is extruded directly onto a chill roll 50 prior to reaching the elastic members 24. In this case, a meltblown adhesive 38c, or other suitable adhesives, may be applied to one or more substrates as well as the latent polymer prior to each of the layers reaching the lamination nip 34. It should be understood that other constructions embodying the features of the invention can be formed through similar modifications to the method. As in the previously-described embodiment, the elastic members 24 may be stretched in a vertical filament lamination process, or in any other suitable process, such that the elastic members 24 are in a stretched configuration when attached to the latent polymer 22 and the substrate 26 or substrates.

The resulting elastic laminate materials 20, once activated, may suitably be stretched by at least about 100%, or at least about 200%, or at least about 400%, and may suitably recover at least about 25%, or at least about 50%, or about 100% of the stretched length. The latent elastic laminate materials 20 may have a basis weight between about 2 and about 60 grams per square meter (gsm), or between about 5 and about 30 gsm, or between about 5 and about 15 gsm.

The amount of latent polymer 22 applied to the elastic members 24 suitably provides enough anchoring force to overcome a retractive force of the elastic members 24 when the latent polymer 22 has been applied to the elastic members 24 while the elastic members 24 are in a stretched state and the latent polymer 22 is at a temperature below a softening point of the latent polymer 22. Furthermore, the amount of latent polymer 22 applied to the elastic members 24 is suitably small enough to allow the laminate 20 to retract into an elastic, gathered structure when the laminate 20 is heated at least to a softening point of the latent polymer 22.

The latent polymer 22 may be applied in the form of filaments, film, starved slot-coated film such as achieved by POROUS COAT equipment from Nordson Corporation of Dawsonville, Ga., a swirled or oscillated application, strand wrapping such as achieved by OMEGA UFD (Uniform Fiber Deposition) model applicator devices available from ITW Dynatech of Henderson, Tenn., melt blow spray, or any combination of these or other applicators. For example, in embodiments in which the latent polymer 22 is applied directly to the elastic members 24, the latent polymer 22 may be applied with oscillating or wrapping/coating action. The degree of circumference wrapping, namely the amount of coating applied to the elastic members 24, depends on the form of the latent polymer 22, as well as the form of the elastic members 24, and the manner in which the laminate 20 is formed. Suitably, the latent polymer 22 may be applied to the elastic members 24 at a basis weight between about 0.5 and about 20 grams per square meter (gsm), or between about 2 and about 15 gsm, or between about 5 and about 12 gsm. In embodiments that include a continuous layer of the latent polymer 22, the use of higher levels of latent polymer 22 may obviate the need for a non-reinforcing tackifier in the laminate 20. Furthermore, the use of higher levels of the latent polymer 22 may provide a material that is less porous and easier to convert compared to laminates having lower levels of adhesive or latent polymer.

The latent polymer 22 may itself may or may not possess latent elasticity. For example, the latent polymer 22 may be an adhesive, or other type of non-elastic polymer. Using a non-elastic polymer can be efficient and can result in cost savings without sacrificing elasticity in the resulting laminate 20. However, elastic polymers may also be used. Thus, examples of suitable latent polymers 22 include adhesives, polyolefins, elastomeric polyolefins, metallocene polyethylene, such as AFFINITY® EG-8185 available from Dow Chemical Company of Midland, Mich., or EXACT® from ExxonMobil Corporation, or any combination of these or other polymers. Furthermore, the latent polymer 22 may include a thermoplastic elastic such as tackified styrenic block-copolymer, such as KRATON® G6673 available from Kraton Polymers of Houston, Tex., polyurethane, or any combination of these or other polymers. In certain embodiments, mostly amorphous adhesives with at or above body temperature glass transition temperatures may be used as the latent polymer 22 for bonding the elastic members 24 to the substrate 26. If the glass transition temperature is lower than body temperature, the latent polymer 22 can potentially relax and lose the latency, particularly when incorporated into personal care garments. Thus, in certain embodiments, the latent polymer 22 may have a glass transition temperature of about 22 degrees Celsius or higher, or about 37 degrees Celsius or higher. Table 1 lists a variety of commercially-available adhesives, each available from Bostik-Findley Adhesives of Wauwatosa, Wis., with various glass transition temperatures (Tg) and storage and loss shear moduli that may serve as suitable latent polymers 22 in the laminate 20 described herein.

TABLE 1

Latent Polymers

| Adhesive | Glass Transition Temperature (° C.) | G' @ 25° C. (dyne/cm$^2$) | G" @ 25° C. (dyne/cm$^2$) |
|---|---|---|---|
| H2525A | 22 | $8.8 \times 10^5$ | $1.8 \times 10^6$ |
| H2096 | 22 | $1.9 \times 10^6$ | $4.1 \times 10^6$ |
| H2717 | 34 | $1.7 \times 10^7$ | $2.2 \times 10^7$ |

The elastic member or members 24 may include filaments, film, foam, scrim, or any combination of these or other types of elastic members. More particularly, examples of suitable materials for forming the elastic members 24 include diblock, triblock, tetrablock, or other multi-block elastomeric copolymers such as olefinic copolymers, including ethylene-propylene-diene monomer (EPDM), styrene-isoprene-styrene (SIS), styrene-butadiene-styrene (SBS), styrene-ethylene/butylene-styrene (SEBS), or styrene-ethylene/propylene-styrene (SEPS), or compounds of these elastomeric copolymers, which may be obtained from Kraton Polymers of Houston, Tex., under the trade designation KRATON® elastomeric resin, or from Dexco, a joint venture between Dow Chemical Company and Exxon-Mobil, under the trade designation VECTOR® (SIS polymers); polyurethanes, including those available from E. I. Du Pont de Nemours Co., under the trade name LYCRA® polyurethane; polyamides, including polyether block amides available from Ato Chemical Company, under the trade name PEBAX® polyether block amide; polyesters, such as those available from E. I. Du Pont de Nemours Co., under the trade name HYTREL® polyester; polyisoprene; cross-linked polybutadiene; and single-site or metallocene-catalyzed polyolefins having density less than about 0.89 grams/cubic centimeter, available from Dow Chemical Co. under the trade name AFFINITY®, or a similar material available from ExxonMobil Corporation under the trade name EXACT™. Elastic members 24 having lower stress relaxation and creep properties tend to maintain their elastic properties while anchored compared to elastic materials having higher stress relaxation properties. Thus, elastic materials having lower stress relaxation and creep properties may be preferred.

The substrate or substrates 26 may include a nonwoven web, for example a spunbonded web or a meltblown web, a woven web, or a film. In certain embodiments, the substrate 26 may be non-elastic; alternatively, the substrate 26 may be stretchable and/or elastomeric. For example, the substrate 26 may be necked, or stretched to impart stretchability in a direction perpendicular to the direction of stretching. Substrates 26 may be formed using conventional processes, including the spunbond and meltblowing processes described in the "DEFINITIONS." For example, the substrate 26 may include a spunbonded web having a basis weight of about 0.1-4.0 osy, suitably 0.2-2.0 osy, or about 0.4-0.6 osy.

The easy handling of the latent elastic laminate material 20 prior to activation and the durable elastic properties of the activated laminates render the latent elastic laminate materials 20 particularly suitable for incorporation into a variety of products, such as personal care garments and cleaning wipes. For example, the latent elastic laminate material 20 may be used to form a leg gasket, a waistband, a liner, and/or a side panel of such personal care garments as diapers 52 (FIG. 7), training pants 54 (FIG. 8), boxer shorts 56 (FIG. 9), certain feminine hygiene products, adult incontinence products, other personal care or medical garments, and the like. Furthermore, the latent elastic laminate material 20 may be formed in-situ during the production of a personal care garment. For example, after passing through the slitting nip, rather than being passed to a winding roll, the laminate 20 may be converted directly into the manufacturing line of a personal care garment or other product.

Figure 7:
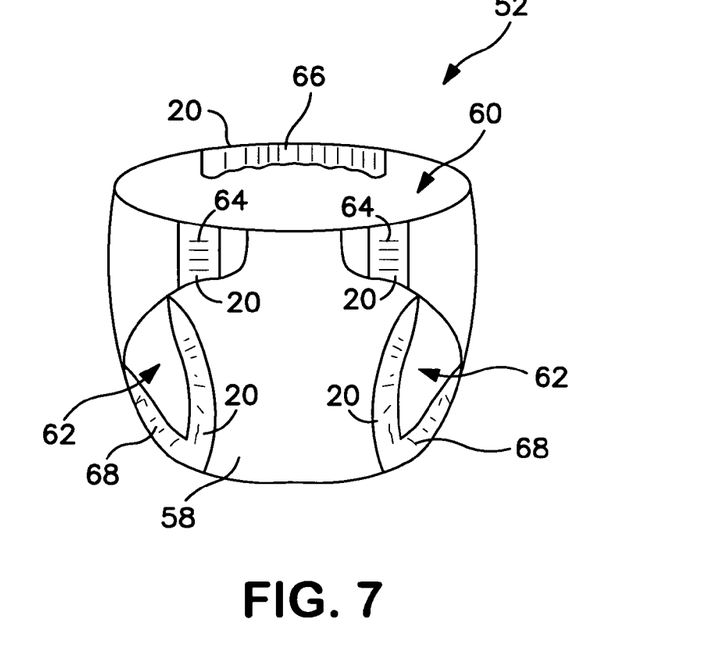
FIG. 7 is a perspective view of a diaper in which a latent elastic laminate material has been incorporated.
Figure 8:
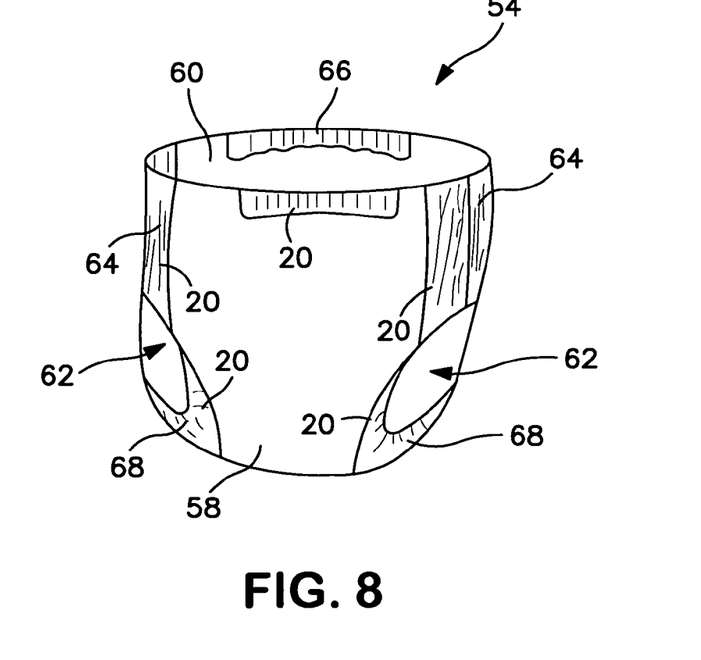
FIG. 8 is a perspective view of a training pant in which a latent elastic laminate material has been incorporated.
Figure 9:
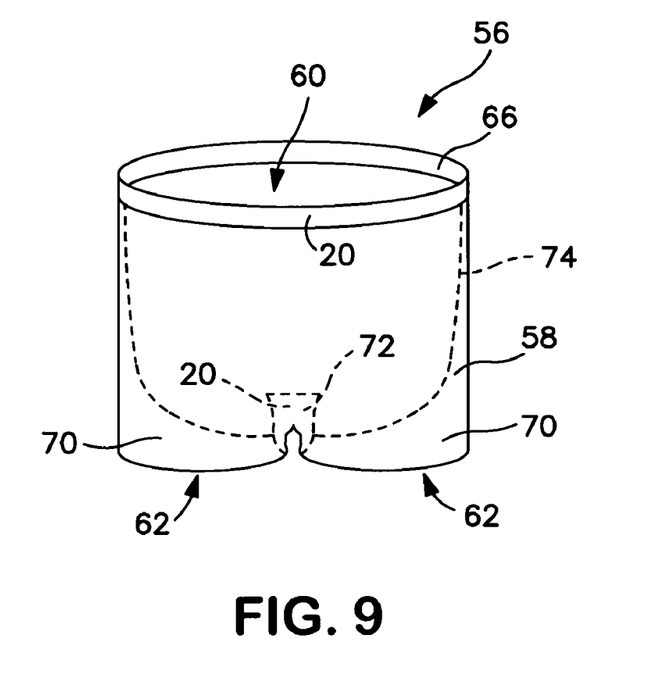
FIG. 9 is a perspective view of boxer shorts in which a latent elastic laminate material has been incorporated.

Referring to FIGS. 7-9, the illustrated personal care garments each include a chassis 58 defining a waist opening 60 and two opposing leg openings 62. Side panels 64 may be refastenable, as in the illustrated diaper 52, or non-refastenable, as in the illustrated training pants 54. Examples of diapers and training pants are described in detail in U.S. Pat. No. 6,663,611 issued to Blaney et al. and U.S. Pat. No. 6,613,033 issued to Popp et al., both of which are incorporated herein by reference in their entirety in a manner consistent with the invention. It will be appreciated that any number of side panel configurations may be used in the context of the invention. The latent elastic laminate materials 20 may be used to form the side panels 64 in part or in their entirety. A waistband region 66 is configured to encircle the waist of the wearer when worn; however, the full circumference of the waistband 66 may or may not be elasticized. Thus, the latent elastic laminate material 20 may be used in the full circumference of the waistband 66 or merely a portion of the waistband 66. For example, a tummy band attaching an absorbent assembly to a garment shell, an example of which is described in U.S. Pat. No. 6,168,585 issued to Cesco-Cancian, incorporated herein by reference in its entirety in a manner consistent with the invention, may include the latent elastic laminate material 20. Similarly, the latent elastic laminate materials 20 may be used in the full circumference of the leg openings 62 or around merely a portion of the leg openings 62 to form a leg gasket 68. Leg gasket components may include leg elastics, leg cuffs, containment flaps, and/or any additional components.

With reference, in particular, to FIG. 9, the chassis 58 of the boxer shorts 56 includes hanging legs 70. The chassis 58 of the boxer shorts 56 further includes a contracted crotch region 72. The contracted crotch region 72 may be positioned approximately transversely midway between the leg openings 62 and aligned with a longitudinal centerline of the chassis 58. The latent elastic laminate materials 20 can be used to form the contracted crotch region 72. In particular embodiments, an absorbent structure 74 may be attached to the chassis 58. The latent elastic laminate materials 30 may be used, in whole or in part, in the formation of various portions of the absorbent structure 74, such as the waistband 66, the side panels 64, and/or the leg gaskets 68. More detailed descriptions and additional embodiments of boxer shorts 56 and other personal care garments in which the latent elastic laminate materials 20 may be applicable are provided in U.S. Patent Application Nos. 2004/0107481 filed by Mortell et al., 2005/0148980 filed by Fitton, and 2005/0131382 filed by Brud et al., each of which is incorporated herein by reference in its entirety in a manner consistent with the invention.

Figure 10:
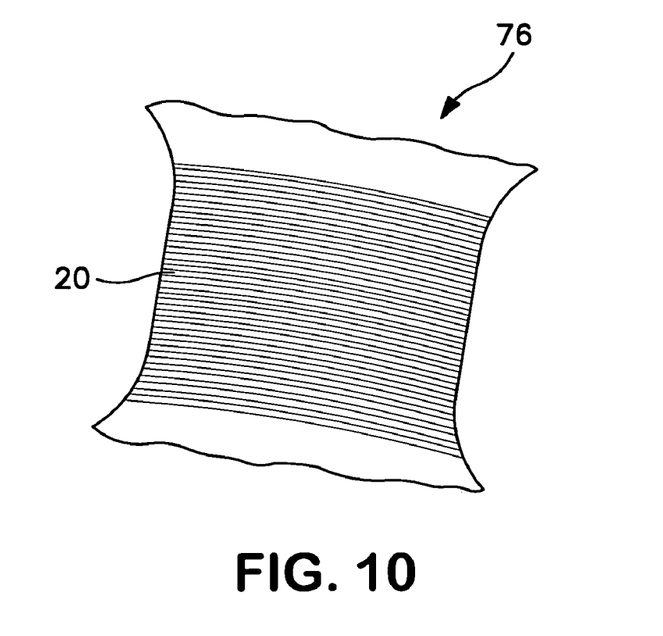
FIG. 10 is a perspective view of a cleaning cloth in which a latent elastic laminate material has been incorporated.

One example of a cleaning wipe 76 is illustrated in FIG. 10. The latent elastic laminate material 20 can be used to make a variety of soft-abrasive cleaning wipe applications, such as cleaning cloths, scrubbing devices, dishcloths, bath poofs, wipes, combinations thereof, and the like. In addition to heat activation, the latent elastic laminate material 20 can be further heated to impart abrasive properties or stiffness to the laminate. For example, the laminate 20 may be heated to between about 90 and about 315 degrees Celsius, or between about 150 and about 290 degrees Celsius, or between about 230 and about 260 degrees Celsius, or between about 260 and about 290 degrees Celsius to impart varying degrees of abrasive properties to the laminate 20. Of course, the temperature and duration of the heating will vary by the types of material and the desired degree of abrasiveness. The heating may be applied when the laminate 20 is in either the relaxed or fully extended state using hot air banks, heated smooth or patterned rolls, ultrasonics, pressure, or any other suitable heating techniques. Furthermore, this heating may be accompanied by relaxation of the web to achieve the desired abrasiveness effect, with relaxation occurring by slowing down the web immediately following the relaxation/on-line heating zone. In an alternative embodiment, the web may be held in a stretched state during on-line heating and relaxed in a subsequent section of the process line. The laminate may also be on-line heated and stored in a stretched state on a roll and allowed to retract only after unwinding in a separate step.

EXAMPLE

This example was carried out to demonstrate the superior elasticity of latent elastic laminate materials compared to non-latent elastic laminate materials.

Elastic filaments were made from KRATON® G6673 from Kraton Polymers using a 10-inch wide, 50 thousandths, 12 holes/inch filament die onto a chilled roll at 10 feet per minute (fpm). The elastic strands were stretched in a VFL stack at 5× speed differential to the nip running at 50 fpm. Various basis weights were produced: 9, 13.5, and 18 gsm.

Simultaneously in the same process, latent polymer filaments were made from AFFINITY EG-8185 metallocene polyethylene from Dow Chemical Company using a 10-inch wide, 30 thousandths, 12 holes/inch filament die directly onto the stretched elastic strands on the apex of the lamination nip roll (running at 50 fpm). Therefore, the latent filaments were substantially unstretched (relaxed) in the lamination phase, while the elastic strands were stretched 5×. Red (1% in elastic polymer) and blue (~1% in latent polymer) indicator pigments were added to differentiate the elastic vs. latent filaments in the final material.

Two layers of meltblown 2525A hot melt elastic attachment adhesive from Bostik-Findley were applied directly to the facing material before the lamination nip at 3 gsm on each side. Both facings were 0.5 ounces per square yard (osy) polypropylene spunbond.

Using a hot air gun, about 50% heat activated retraction was seen in the green state on the laminate having 18 gsm elastic filaments with the latent polymer. Aged samples of the same laminate had about 41% heat activated retraction from a relaxed state (stored off the roll). A control laminate in which no latent polymer was present had about 15% heat activated retraction from the relaxed state.

Heat Activated Retraction Test Method (Dry Method)

Measure 100 mm on roll, cut, then measure retracted length after 10 minutes, then place in dry oven (loose hanging position) at 160 degrees Fahrenheit (71 degrees Celsius) for 1 minute. Measure the final length after heat activation. Measure original sample after 24 hours for MR2* calculation.

Calculated Values:

Heat Activated Retraction (HAR) is measured by subtracting heat activated length from the off-the-roll length as a percent of off-the-roll length:

HAR=[(retracted length after 10 min.)−(length after heat activation)]/retracted length after 10 min., as a percent.

MR1 and MR2* are the measured retractions in the ambient state upon release from a tension wound roll/spool.

MR1 is the initial retraction expected in converting process immediately after leaving the roll.

MR1=[(initial length or 100 mm)−(retracted length after 10 min.)]/100 mm, as a percent.

MR2* is the continued retraction after a specified time period (for example, 24 hours).

MR2*=[(retracted length after 10 min.)−(retracted length after 24 hours)]/retracted length after 10 min., as a percent.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for producing a latent elastic laminate material, comprising:
   stretching at least one elastic member;
   extruding a latent polymer in the form of a film or filaments;
   applying the latent polymer onto the at least one stretched elastic member, wherein the latent polymer is applied onto the at least one stretched elastic member at a temperature below its softening point;
   applying an adhesive to at least one substrate, the at least one elastic member, the latent polymer or combinations thereof;
   attaching at least one substrate to the latent polymer on the at least one stretched elastic member, wherein the temperature of the adhesive is below the softening point of the latent polymer upon attachment of the at least one substrate;
   wherein the amount of latent polymer applied to the at least one stretched elastic member provides enough force to overcome a retractive force of the at least one elastic member when the polymer is at a temperature below a softening point of the polymer, and the amount of polymer is small enough to allow the laminate to retract into an elastic, gathered structure when the laminate is heated to at least a softening point of the polymer.

2. The method of claim 1, further comprising using a vertical filament lamination process to stretch the at least one elastic member.

3. The method of claim 1, wherein the latent polymer is in the form of at least one of the group consisting of filaments, film, starved slot-coated film, a swirled application, an oscillated application, strand wrapping, melt blow spray, and combinations thereof.

4. The method of claim 1, wherein the latent polymer comprises at least one of the group consisting of adhesive, polyolefin, elastomeric polyolefin, and combinations thereof.

5. The method of claim 1, wherein the latent polymer comprises a non-elastic polymer.

6. The method of claim 1, wherein the latent polymer comprises an adhesive.

7. The method of claim 1, wherein the latent polymer comprises a thermoplastic elastic selected from the group consisting of tackified styrenic block-copolymer, polyurethane, and combinations thereof.

8. The method of claim 1, further comprising applying a hot melt adhesive to the at least one substrate prior to attaching the at least one substrate to the latent polymer on the at least one stretched elastic member.

9. The method of claim 1, further comprising heating the laminate to impart abrasive properties to the laminate.

10. The method of claim 1, wherein the latent polymer is extruded directly onto a chill roll.

* * * * *